United States Patent [19]
Delhaes

[11] Patent Number: 4,601,685
[45] Date of Patent: Jul. 22, 1986

[54] ENDLESS BELT, AND ROLLER SYSTEM WITH SUCH A BELT

[75] Inventor: Johannes C. Delhaes, Heerlen, Netherlands

[73] Assignee: Rubber- en Kunststoffabriek ENBI B. V., Nuth, Netherlands

[21] Appl. No.: 746,389

[22] Filed: Jun. 19, 1985

[30] Foreign Application Priority Data

Jul. 3, 1984 [DE] Fed. Rep. of Germany ....... 3424394

[51] Int. Cl.[4] ............................................. F16H 55/32
[52] U.S. Cl. ..................................... 474/188; 198/840
[58] Field of Search ............... 474/189, 151, 239, 188; 198/840, 844, 847

[56] References Cited

U.S. PATENT DOCUMENTS

| 207,626 | 9/1878 | Sargent | 198/840 X |
|---|---|---|---|
| 2,375,065 | 5/1945 | Asklie | 198/840 X |
| 3,482,462 | 12/1969 | Dahlem | 474/239 |
| 3,642,119 | 2/1972 | Warwick | 198/840 X |
| 4,015,484 | 4/1977 | Taylor | 198/840 X |
| 4,249,653 | 2/1981 | Kufferath-Kassner | 198/844 X |

*Primary Examiner*—James A. Leppink
*Assistant Examiner*—Thuy M. Bui
*Attorney, Agent, or Firm*—W. G. Fasse; D. H. Kane, Jr.

[57] ABSTRACT

An endless conveyer or drive belt reaches with a portion of its cross-sectional configuration facing toward respective guide or drive rollers, into corresponding ring grooves in the rollers. The projecting portion includes an endless helical spring partially embedded in the drive belt. The ends of the helical spring are connected to each other. The spring keeps the belt trained on the rollers.

8 Claims, 3 Drawing Figures

ENDLESS BELT, AND ROLLER SYSTEM WITH SUCH A BELT

FIELD OF THE INVENTION

The invention relates to an endless belt and to a roller system with such an endless belt. The body of the belt is made of an elastically deformable material and reaches with at least one cross-sectional portion of the belt body into a ring groove provided in each roller of the system.

DESCRIPTION OF THE PRIOR ART

Transport and driving belts of the type just mentioned are known in the art, whereby the cross-sectional portion of the belt which reaches into ring grooves of the rollers prevents a lateral excursion of the belt relative to the rotational axes of the two rollers. However, there is a permanent tendency of the belt to move laterally out of a trained position and such tendency subjects the cross-sectional portion of the belt reaching into the ring grooves to a corresponding stress causing wear and tear. In order to avoid a premature excessive wear and tear of the drive or transport belt, especially in the area in which the cross sectional portion of the belt reaches into the ring grooves of the rollers, it is generally known to reinforce the strength of the belts with high strength synthetic fibers or threads or steel wires. It is also known to reinforce V-belt type drive belts with a high strength linen fabric for obtaining an improved wear and tear resistance.

Certain transport and drive belts such as are employed, for example, in paper transport devices of copying machines and the like are expected to provide a good friction between the surface of the belt and the paper sheets to be transported. Such good friction in turn requires a corresponding elasticity of the material of which the belts are made. As a result, the requirement for a good friction and the requirement for good wear and tear are not necessarily compatible with each other because the reinforcements generally used for drive belts in the prior art reduce their elasticity and thus the ability of the belt to provide the required surface friction. Further, a certain elasticity for such belts is also required because normally a plurality of such belts run alongside each other over the same guide rollers. Any tolerances in the belts then can only be compensated to a sufficient extent if the material of which the belts are made as a respective elasticity.

OBJECTS OF THE INVENTION

In view of the above it is the aim of the invention to achieve the following objects singly or in combination:

to construct a transport or drive belt capable of running over or around guide or drive rollers in such a manner that the belt has the required elasticity while simultaneously keeping the belt trained on the respective rollers;

to make the belts of an elastically deformable material which is capable to reach with a cross-sectional portion of the belt into a ring groove on the respective rollers without the need for reinforcing this cross-sectional portion with reinforcing means which diminish the elasticity of the belt or belts; and to provide a transport or drive belt system in which an elastically yielding belt is kept properly trained on its drive or guide rollers, in spite of its elasticity.

SUMMARY OF THE INVENTION

According to the invention at least one helical spring, the ends of which are interconnected to form an endless spring, is at least partially embedded in the elastically yielding material of the belt body so that a portion of the embedded spring projects from a surface of the belt, especially the roller facing surface of the belt. In the system according to the invention the respective guide or transport rollers are provided with one or more grooves in which the projecting spring portion is received without interfering with the movement of the belt in the longitudinal direction while preventing any excursions of the belt in the direction of the rotational axes of the respective transport or guide rollers.

It is an advantage of the transport or drive belt according to the invention that it can be secured against lateral excursions on the respective drive or guide rollers by the endless helical spring projecting from the roller facing surface of the belt without any impairment of the elasticity of the belt by the endless helical spring. This feature in turn has the advantage that a plurality of belts may be running alongside each other with generous tolerances relative to one another while running over the same guide or driver rollers. This is possible because the belts of the invention retain an elasticity which in turn is able or sufficient to compensate for such tolerances sufficiently that a secure travelling of each belt is assured. Additionally, the spring according to the invention makes it possible to produce especially belts of highly elastic material such as elastic rubber or the like without impairing the running precision of these belts.

BRIEF DESCRIPTION OF THE DRAWINGS

The invention will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
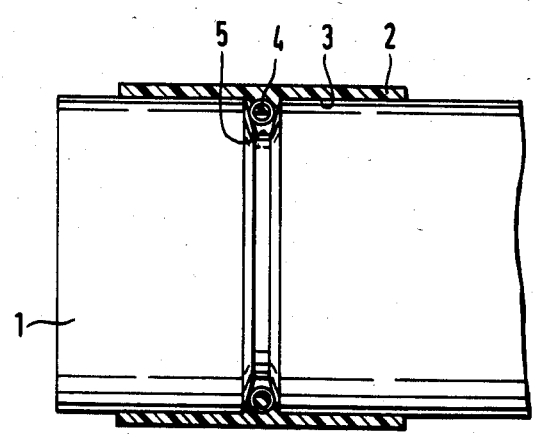
FIG. 1 is a sectional view through a roller and transport or drive belt according to the invention equipped with a single endless helical spring.

In FIG. 1 a roller 1 guides or drives a belt 2 made of elastical, flexible material. According to the invention an endless, helical spring 4 is partially embedded in the inwardly facing surface 3 of the belt 2 so that the spring, or rather a portion of the spring 4 projects radially inwardly relative to the rotational axis of the roller 1. The roller 1 is provided with a ring groove 5 which is open radially outwardly and which has a trapezoidal cross-section.

The groove 5 has a radial depth D which is larger than the radial projection P of the portion of the spring 4 extending radially inwardly beyond the surface 3 of the belt 2. Further, the groove 5 has a bottom width, in the axial direction, which is smaller than the width of the projecting portion of the spring 4, whereby an axial play between the spring 4 and the groove 5 is avoided to keep the belt properly trained on the roller 1.

Figure 2:
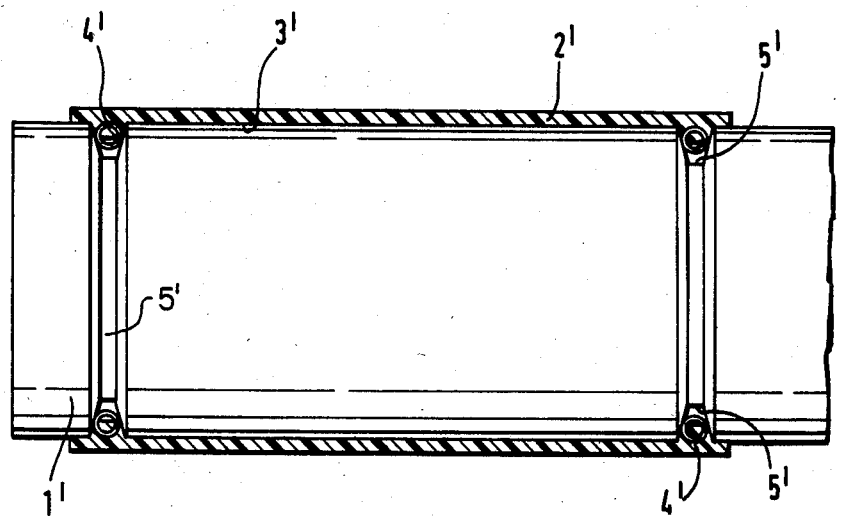
FIG. 2 is a sectional view similar to that of FIG. 1 but showing a drive or transport belt equipped with two endless helical springs.

In FIG. 2 the roller 1' is equipped with two grooves 5' located for cooperation with two projecting springs 4' embedded in the belt 2' adjacent the longitudinal edges of the belt 2'. Here again, the springs 4' project at least partially from the inwardly facing surface 3' of the belt 2' for reaching sufficiently into the trapezoidal grooves 5' to prevent an axial excursion of the belt 2'.

The above mentioned dimensioning of the projection of the spring or springs 4, 4' and of the grooves 5, 5' not only prevents an axial play between the springs and the respective roller, it also makes sure that the springs can surround the rollers with a certain radially inwardly directed biasing force, whereby the proper travel of the springs through the grooves is assured even though the springs 4, 4' contact the flanks of the groove without play. This feature eliminates any axial back and forth movement of the spring 4, 4' relative to the roller, thereby also eliminating the respective wear and tear.

Generally, it has been found to be sufficient to hold even a highly elastic belt properly trained on its roller even with a single endless helical spring as shown in FIG. 1. In that instance the respective rollers or drive shafts will require only one groove for each belt. Further, in this instance, it is most efficient to place the helical spring centrally between the edges of the belt as shown in FIG. 1. The same applies to the positioning of the ring grooves in the roller or rollers.

Further, even belts of substantial width can be properly trained with but one helical spring. However, in order to avoid an axial stretching and an axial contraction as well as fulling movements of the highly elastic belt it may be desirable to use two springs placed as shown in FIG. 2, whereby the respective grooves in the rollers would also be spaced accordingly.

According to the invention the proper training of the belt on its rollers is assured independently of the elasticity of the belts so that it is now possible to make these belts of an elastically deformable material having a Shore hardness of less than 40. A material suitable for this purpose is known under the name LIM (Liquid Injection Moulding). Such material is suitable for liquid injection molding methods. Prior to this invention such highly elastic material was not suitable for making paper transport belts and the like because numerous tests have shown that belts made of such a material are unable to stay trained even if they are secured to the rollers with a substantial radially inwardly directed bias. Even providing the guide roller surfaces with a crowned or cambered surface was not of much help in preventing these highly elastic belts from running off their trained course. Nevertheless, it is desirable to use such material for making the belts because they provide an extraordinarily good friction on their surface and thus are exceptionally suitable for transport and drive belts, for example in a copier for transporting sheets of paper.

Figure 3:
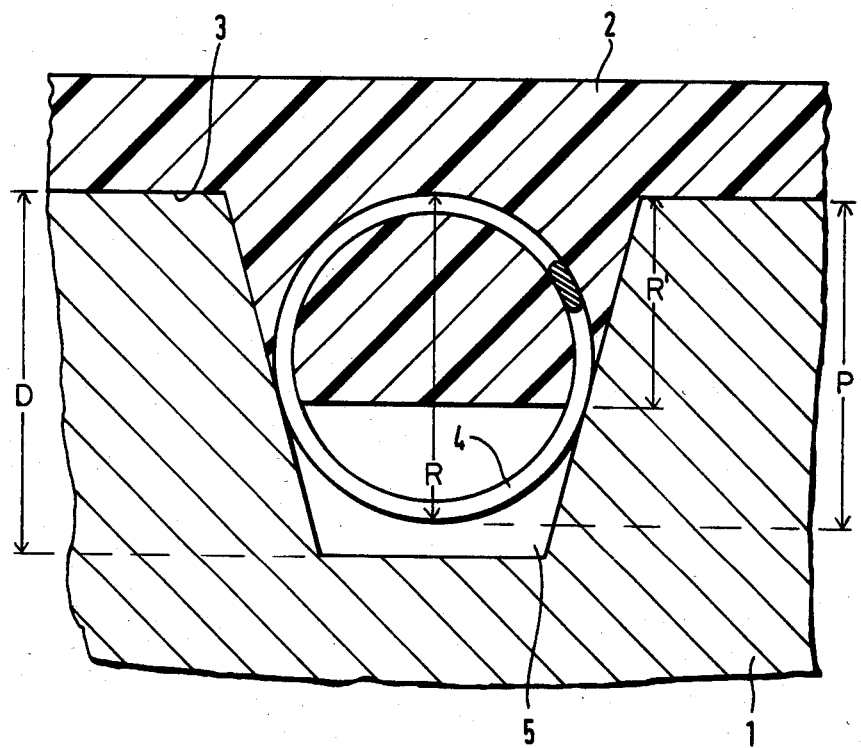
FIG. 3 is a sectional view, on an enlarged scale, illustrating the embedding depth.

Incidentally, FIG. 3 shows, on an enlarged scale, the embedding depth R' of the spring coil diameter R. It is feasible to embed these springs 4, 4' in the material of the belt 2, 2' to an extent corresponding about to the radius of the spring coil.

In any event, the embedding is such that an intimate bonding between the spring and the material of the jacket is assured so that there is no danger that the spring 4, 4' becomes separated from the belt 2, 2' due to a fulling motion, for example.

It is also within the present teaching to cover the individual winding of the helical springs 4, 4' for example, with a brass coating or a bonding agent. Such coating may be accomplished, for example, by an immersion method or by electroplating. The primary purpose of the coatings is to improve the bonding between the material of the roller jacket 2, 2' and the surfaces of the helical springs 4, 4'. It has been found to be advantageous to initially dimension the helical springs 4, 4' in such a manner that upon connection of the spring ends to each other, the windings touch each other and that after attaching the springs 4, 4' to the grooves 5, 5' there is a certain radially inwardly effective biasing force which causes the individual windings to be individually spaced from each other. The spacings then permit the material of the roller jacket to even enter into the space confined inside of the helical spring or springs, whereby an especially intimate bonding between the jacket material and the spring is achieved.

If desired, the hollow space inside the spring or springs may be completely filled with the jacket material.

Although the invention has been described with reference to specific example embodiments, it will be appreciated, that it is intended to cover all modifications and equivalents within the scope of the appended claims.

What I claim is:

1. An endless belt and roller system, comprising an endless belt having a belt body made of an elastically deformable material and having a roller facing inner surface and an opposite outer surface, at least two rollers on which said endless belt is held, each of said two rollers having groove means therein which are open radially outwardly, said endless belt comprising endless spring means partially embedded in said belt body so that a spring portion protrudes from said roller facing inner surface, said endless spring means reaching into said groove means for keeping said endless belt trained on said two rollers.

2. The system of claim 1, wherein said ring groove means have a trapezoidal cross-section with a groove bottom having a given width and with a given groove depth, said protruding spring portion having a first axial dimension larger than said groove bottom and a second radial dimension smaller than said groove depth, whereby said endless spring means are firmly held in said groove means for keeping said endless belt trained on said two rollers.

3. The system of claim 1, wherein said elastically deformable material of said belt body has a Shore hardness of less than 40.

4. The belt of claim 1, wherein said belt body has longitudinal edges, and wherein said helical spring means comprise a single endless spring partially embedded in said belt body centrally between said edges.

5. The belt of claim 1, wherein said belt body has longitudinal edges, and wherein said helical spring means comprise two endless springs partially embedded in said belt body near said longitudinal edges.

6. The belt of claim 1, wherein said helical spring means have a given spring coil diameter, and wherein said endless spring means are embedded in said elastically deformable material up to a portion of said given spring coil diameter.

7. The system of claim 6, wherein said portion of embedded spring coil outer diameter corresponds to about 50% of said given spring coil diameter.

8. An endless belt, especially a conveyor or drive belt, made of an elastically deformable material, comprising a belt body having an outwardly facing surface and an inwardly facing surface, and helical spring means partially embedded in said elastically deformable material of said belt so that said helical spring means protrude from one of said surfaces for keeping said belt on track, said helical spring means having ends which are connected to each other.

* * * * *